UNITED STATES PATENT OFFICE.

WILLIAM JAMES THOROLD, OF LONDON, ENGLAND.

COMPOSITION OF MATTER.

959,650.

Specification of Letters Patent. Patented May 31, 1910.

No Drawing. Application filed May 15, 1909. Serial No. 496,314.

*To all whom it may concern:*

Be it known that I, WILLIAM JAMES THOROLD, a subject of the King of Great Britain and Ireland, residing at 90-93 Fleet street, in the city of London, England, have invented a new and useful Composition of Matter, of which the following is a specification.

The present invention relates to a composition of matter and comprises an improved india - rubber composition particularly adapted for use in rendering the air tubes of pneumatic tires or the covers thereof in such cases when the air tubes are dispensed with, capable of automatically sealing up any puncture or incision caused therein and so preventing the escape of the contained compressed air.

The composition consists of pure rubber held in suspension within a crude gas tar benzene solvent.

The solvent which is employed is a crude gas tar benzene having a high boiling point. The particular benzene employed must also have the following characteristics:—(a) specific gravity at 15° C., .880; (b) refractive index at 20° C., 1.5060; (c) distilling between 125° C. and 180° C., and (d) flash point (open test) 105° F.

The usual coal tar solvent naphtha having a boiling point of about 100° C. to 140° C. is useless for the present invention and according to my experience success depends upon the employment of a benzene solvent which boils from 125° C. to 180° C. for which purpose the proportions of hydrocarbon of boiling point below 120° C. must be relatively small.

It has been ascertained by long-continued experiment that a suitable composition for employment with air tubes of pneumatic tires for the purpose of rendering them self-healing comprises pure para rubber 4.3% and solvent 95.7%.

I claim—

1. The herein described composition of matter consisting of pure rubber dissolved in a crude gas tar benzene distilling between 125° C. and 180° C. as set forth.

2. The herein described composition of matter consisting of 4.3% of pure rubber dissolved in 95.7% of a crude gas tar benzene distilling between 125° C. and 180° C. as set forth.

In testimony whereof I have hereunto signed my name in the presence of two subscribing witnesses.

WILLIAM JAMES THOROLD.

Witnesses:
EDWARD LESLIE GEORGE,
H. D. JAMESON.